(12) United States Patent
Kim et al.

(10) Patent No.: US 11,422,078 B2
(45) Date of Patent: Aug. 23, 2022

(54) TESTING WEAR RESISTANCE IN REPRESENTATIVE DOWNHOLE CONDITIONS

(71) Applicant: HALLIBURTON ENERGY SERVICES, INC., Houston, TX (US)

(72) Inventors: Byong Jun Kim, Sugar Land, TX (US); Krutibas Panda, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 593 days.

(21) Appl. No.: 16/346,052

(22) PCT Filed: May 25, 2018

(86) PCT No.: PCT/US2018/034696
§ 371 (c)(1),
(2) Date: Apr. 29, 2019

(87) PCT Pub. No.: WO2019/226177
PCT Pub. Date: Nov. 28, 2019

(65) Prior Publication Data
US 2021/0356371 A1 Nov. 18, 2021

(51) Int. Cl.
*G01N 3/56* (2006.01)
*E21B 47/06* (2012.01)

(52) U.S. Cl.
CPC ............ *G01N 3/56* (2013.01); *E21B 47/06* (2013.01); *G01N 2203/023* (2013.01); *G01N 2203/0226* (2013.01)

(58) Field of Classification Search
CPC ............ G01N 3/56; G01N 2203/0226; G01N 2203/023; E21B 47/06

(Continued)

(56) References Cited

U.S. PATENT DOCUMENTS 3,913,377 A * 10/1975 Lindeman ............... G01N 19/02
  73/10
4,446,717 A    5/1984 Johanson et al.
(Continued)

FOREIGN PATENT DOCUMENTS

CN       101344470 B       9/2010
CN       105954133 A *     9/2016
(Continued)

OTHER PUBLICATIONS

Translation CN-106769587-A (Year: 2017).*
(Continued)

*Primary Examiner* — Alexander A Mercado
*Assistant Examiner* — Monica S Young
(74) *Attorney, Agent, or Firm* — Haynes and Boone, LLP

(57) ABSTRACT

A system for causing wear to a material in representative downhole conditions is provided, and can include a housing with a chamber at least partially filled with a fluid, an abrasion device at least partially immersed in the fluid, a heat transfer element thermally coupled to a housing, an engagement arm coupled to the housing and a test sample attached to the engagement arm that can apply an engagement force to the test sample causing engagement of the test sample with the abrasion device. An actuation device can displace the abrasion device relative to the test sample, and cause wear of the test sample during a wear test in response to the engagement of the test sample with the abrasion device. A controller can control a thermal output of the heat transfer element to maintain the chamber within a temperature range that is representative of the downhole conditions.

25 Claims, 8 Drawing Sheets

(58) Field of Classification Search
USPC .............................................................. 73/7
See application file for complete search history.

(56) References Cited

U.S. PATENT DOCUMENTS

| | | | |
|---|---|---|---|
| 4,552,025 A | 11/1985 | Barker et al. | |
| 4,939,922 A * | 7/1990 | Smalley | G01N 3/56 374/51 |
| 5,007,284 A * | 4/1991 | Slone | G01M 13/005 73/114.78 |
| 6,112,573 A * | 9/2000 | Thelen | G01N 33/30 73/10 |
| 6,412,330 B1 | 7/2002 | Dicello et al. | |
| 6,546,782 B1 * | 4/2003 | De La Cruz | G01N 3/56 73/10 |
| 6,752,001 B1 * | 6/2004 | LaPointe | G01N 19/02 73/10 |
| 9,194,784 B1 * | 11/2015 | Bi | G01N 11/14 |
| 2007/0017300 A1 * | 1/2007 | Bushey | G01N 3/56 73/856 |
| 2011/0246096 A1 * | 10/2011 | Bellin | G01N 29/14 702/41 |
| 2017/0216990 A1 * | 8/2017 | Messmer | B24B 57/04 |
| 2019/0033189 A1 * | 1/2019 | Coe | G01N 3/32 |
| 2019/0301989 A1 * | 10/2019 | Chahal | G01N 33/367 |

FOREIGN PATENT DOCUMENTS

| | | | |
|---|---|---|---|
| CN | 106769587 A | * | 5/2017 |
| CN | 107132140 A | * | 9/2017 |
| CN | 109060572 A | * | 12/2018 |

OTHER PUBLICATIONS

Korean Intellectual Property Office, International Search Report and Written Opinion, PCT/US2018/034696, dated Feb. 12, 2019, 18 pages, Korea.

* cited by examiner

TESTING WEAR RESISTANCE IN REPRESENTATIVE DOWNHOLE CONDITIONS

CROSS-REFERENCE TO RELATED APPLICATIONS

This application is a U.S. national stage patent application of International Patent Application No. PCT/US2018/034696, filed on May 25, 2018, the benefit of which is claimed and the disclosure of which is incorporated herein by reference in its entirety.

TECHNICAL FIELD

The present disclosure generally relates to oilfield equipment and, in particular, to materials used in downhole tools and wellbore systems, and techniques for testing a wear resistance of materials used in a downhole environment. More particularly still, the present disclosure relates to methods and systems for testing the wear resistance of these materials in downhole conditions, such as at characteristic temperatures and pressures of a downhole environment.

BACKGROUND

The properties of polymeric materials such as plastics, rubbers, and their composites vary significantly as a function of temperature. For example, tensile strength and elongation of typical rubber compounds may decrease by 50% to 90% of their original properties at their maximum rated temperatures. This is in contrast to metallic material or ceramic materials where such property decrease is generally a fraction of what is exhibited by polymeric materials. Therefore, it can be beneficial to evaluate properties (such as mechanical properties, wear resistance etc.) of polymeric materials at their rated temperature ranges including temperatures that are representative of a downhole environment in a wellbore.

Furthermore, the polymeric material properties may vary significantly in different fluids at a given temperature. For example, tensile strength and elongation of typical rubber compounds can change minus 100% up to plus several hundred % of its original properties in various fluid systems. Therefore, it can also be beneficial to evaluate the properties of polymeric materials in various fluids including those fluids that are representative of a downhole environment in a wellbore.

Even though non-polymeric materials (such as metals, ceramics, etc.) may be much less affected at various temperatures and immersed in various fluids, corrosion rates can be dramatically enhanced with higher temperatures (e.g. 20 to 200 degrees C.). Therefore, the wear experienced by these non-polymeric materials can be significantly impacted by characteristic downhole environments. Accordingly, it can also be beneficial to evaluate the properties of non-polymeric materials in various fluids and at various temperatures including those fluids and temperatures that are representative of a downhole environment in a wellbore.

In the oil and gas industry, numerous products include various materials (e.g. polymeric or non-polymeric materials) and are exposed to wellbore temperatures, pressures, formation oils and brines, drilling muds, completion fluids, fracking fluids, acidizing solutions, cement slurry, steam, and so on. By evaluating these products at downhole temperatures, pressures, and environmental fluids, a more accurate understanding of the actual lifespans of these products can be established and products can be better designed to overcome the damaging effects of the downhole environment. Some products, such as dynamic seals, protective wear sleeves, pressure sensing rubber pads, and completion packers can greatly benefit from excellent wear/abrasion resistance and an increased useful lifespan.

There are numerous methods and testers for comparative measurements of wear resistance. These wear testers are generally designed for tire, conveyer belt, or shoe industries, where wear properties do not require evaluation at high temperatures while immersed in various types aggressive fluids. Existing testers and methods generally measure the weight loss after wear test in ambient environment.

However, in oil and gas industry, temperature often varies from an artic low to greater than 250 degree Celsius and chemical formulations for completion fluids, drilling muds, fracturing fluids, acidizing fluids (as well as other fluids) in the oilfield operations are almost limitless, each of which can significantly affect the wear resistance of materials. Therefore, it will be readily appreciated that improvements in the arts of testing the wear of various materials in varied conditions are continually needed.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements. Embodiments are described in detail hereinafter with reference to the accompanying figures, in which.

DETAILED DESCRIPTION OF THE DISCLOSURE

Generally, this disclosure provides a system and method for causing wear to a material in representative downhole conditions. The system can include a housing with a chamber at least partially filled with a fluid, an abrasion device at least partially immersed in the fluid, a heat transfer element thermally coupled to the housing. The system can also include an engagement arm coupled to the housing and a test sample of the material attached to the engagement arm, with the engagement arm configured to apply an engagement force through the engagement arm to the test sample, which causes engagement of the test sample with the abrasion device. An actuation device can displace the abrasion device relative to the test sample, and cause wear of the test sample during a wear test in response to the engagement of the test sample with the abrasion device. A controller can control a thermal output of the heat transfer element to maintain the chamber within a temperature range that is representative of the downhole conditions.

Figure 1A:
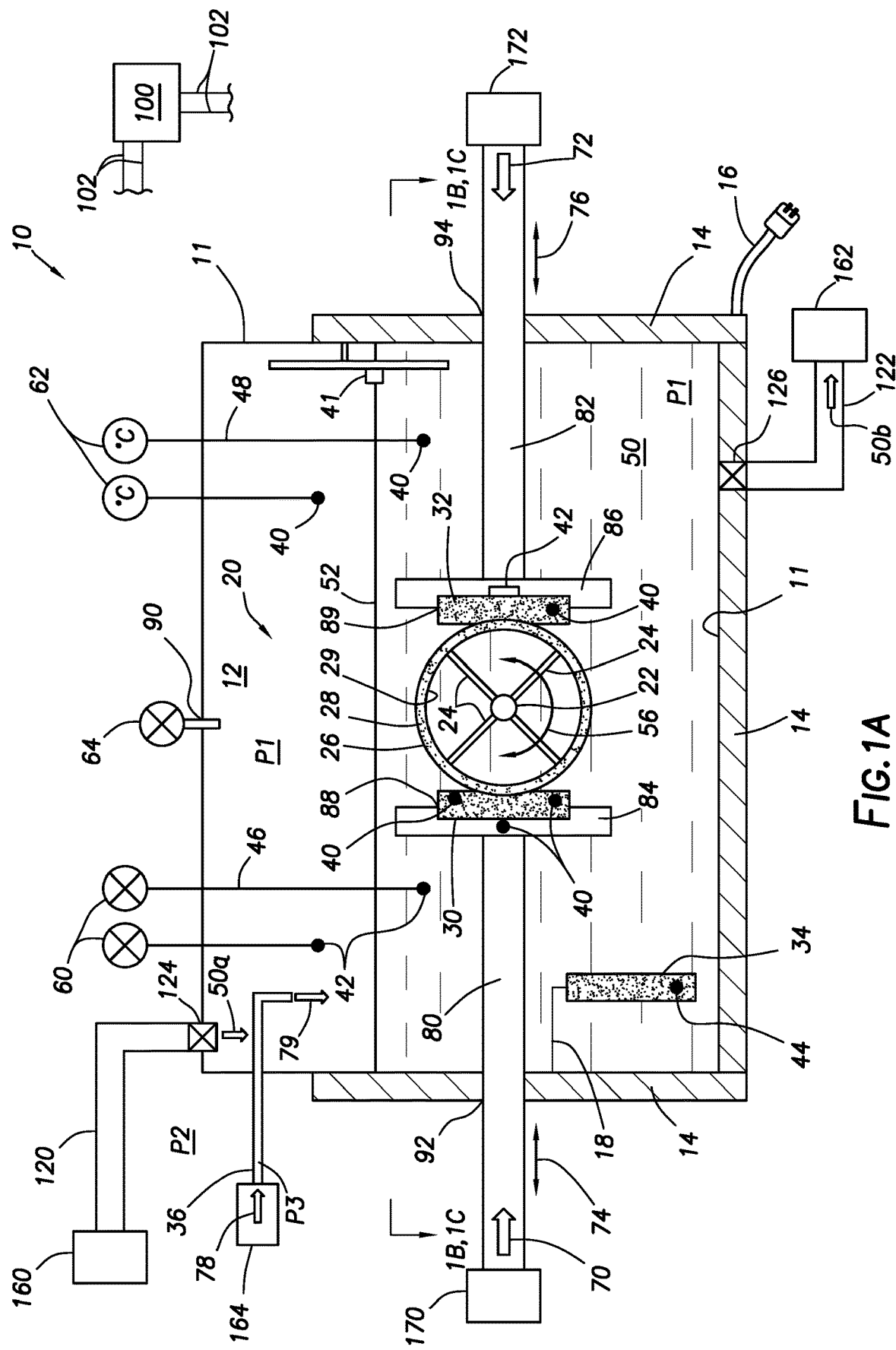
FIG. 1A is a representative partial cross-sectional side view of a system for emulating the wear of one or more samples in a characteristic wellbore environment, according to one or more example embodiments.

FIG. 1A shows a representative partial cross-sectional side view of a system 10 for measuring wear of one or more samples 30, 32 in a characteristic wellbore environment. The system 10 can include a housing 11 that contains a pressure chamber 12 with a heat transfer element 14 coupled to at least a portion of the housing 11 to maintain the pressure chamber 12 and its contents at a desired temperature during wear test operations. The heat transfer element 14 can be powered by a power cable 16 or other suitable means for energizing the heat transfer element 14. An abrasion device 20 can be positioned within the chamber 12 to abrade (i.e. cause wear to) the samples 30, 32 by moving the device relative to the samples 30, 32 while maintaining engagement between the device 20 and the one or more samples 30, 32.

In this example embodiment, the abrasion device 20 is a hollow cylindrically shaped drum 28 with an inner surface 29 and an outer surface 26. The drum 28 can be attached to a drive shaft 22 by spokes 24, such that when the drive shaft 22 is rotated in either direction (arrows 56), the drum 28 is rotated with the drive shaft 22. The drum 28 can be positioned in the chamber 12 between two samples 30, 32. The outer surface 26 of the drum 28 can engage the samples 30, 32 while the drum 28 is rotated. This engagement can cause friction between the drum 28 and the samples 30, 32 resulting in increased temperature and wear of the samples 30, 32. The outer surface 26 can be a coating of an abrasive material adhered to the exterior of the drum 28. Therefore, the outer surface 26 can be used to abrade the samples 30, 32, whether it is a coating or merely the outer surface of the drum 28 material.

The samples 30, 32 can be mounted to retainers 84, 86 respectively. The retainers 84, 86 can hold the respective samples 30, 32 in place during testing operations. The samples 30, 32 can be installed in respective recesses 88, 89 of the retainers 84, 86 as shown in FIG. 1A. However, these recesses are not required to removably attach the samples 30, 32 to the retainers 84, 86. The retainers 84, 86 can be attached to respective engagement arms 80, 82. An engagement force 70, 72 can be applied to an engagement arm 80, 82 that transfers the engagement force 70, 72 to the sample 30, 32 that causes engagement the sample 30, 32 with the drum 28. One or both of the engagement arms 80, 82 can be configured to move in and out of the chamber 12 through a wall of the housing 11 as shown by arrows 74, 76 to engage/disengage the samples 30, 32 with the drum 28.

The engagement forces 70, 72 can each be supplied by a force generation means (not shown), such as a pressure means (e.g. pneumatic pressure, hydraulic pressure, etc.), electromechanical means (e.g. solenoids, piezoelectric elements, etc.), and/or mechanical means (e.g. a biasing device, threaded shaft, weights acted on via gravity, etc.). As the engagement forces 70, 72 are increased, the engagement arms 80, 82 can be extended into the chamber 12 through a wall of the housing 11 thereby engaging the samples 30, 32 with the drum 28. The controller 100 can operate to control the engagement forces 70, 72 to maintain the engagement forces 70, 72 at a desired level or produce a profile of engagement forces 70, 72 over time to simulate varying environmental conditions.

It should be understood that the samples 30, 32 can include an abrading material and the drum 28 can be the sample material being tested for wear resistance. The drum 28 can be removably attached to the drive shaft 22 to permit installation and removal of the drum during testing operations. The drum 28 can be screwed onto or otherwise removably mounted to the drive shaft 22. One or more of the samples 30, 32 can be used to abrade the outer surface 26 of the drum 28 as the drum rotates. The drum can also be solid instead of a hollow structure, thus spokes 24 may not be required to attach the drum to the drive shaft.

The engagement arms 80, 82 can extend through openings 92, 94 in the housing 11. Each of these openings 92, 94 provide a sealing means that seals against a respective one of the engagement arms 80, 82, thereby allowing pressure P1 within the chamber 12 to be increased above the pressure P2 external to the chamber 12. The engagement arms 80, 82 can be made of any construction and any configuration as long as the configuration and construction allow for maintaining the pressure P1 in the chamber 12 at a desired level and also delivering the one or more engagement forces 70, 72 to the respective samples 30, 32.

The abrasion device 20 and the samples 30, 32 can be immersed in a fluid 50 that at least partially fills the chamber 12 with the surface 52 of the fluid 50 preferably above the samples 30, 32. However, it should be understood, that a test can also be performed without any fluid 50 filling the chamber 12, with the surface 52 of the fluid 50 below the top of the samples, or with the fluid 50 being a gas that fills the chamber without a surface 52 dividing the fluid 50 from a remaining volume in the chamber 12.

Fluid 50 can enter the chamber 12 as fluid 50a through an inlet flow passage 120 and exit the chamber 12 as fluid 50b through outlet flow passage 122. A valve 124 can be positioned in the inlet flow passage 120 to permit or prevent fluid flow through the passage 120 into the chamber 12. A valve 126 can be positioned in the outlet flow passage 122 to permit or prevent fluid flow through the passage 122 and out of the chamber 12. It should be understood that the valves 124, 126 can be positioned anywhere along the respective flow passages. For example, the valve 124 can be positioned at a proximal end portion of the inlet flow passage 120, as opposed to the distal end portion shown in FIG. 1. Additionally, the valve 126 can be positioned at a distal end portion of the outlet flow passage 122, as opposed to the proximal end portion shown in FIG. 1.

The valve 124 can be at least partially opened by the controller 100 to at least partially fill the chamber 12 with fluid 50, allowing fluid 50a to enter the chamber as fluid 50. When the desired level or amount of fluid has been input into the chamber 12, the valve 124 can be closed by the controller 100 to allow pressure to be maintained within the chamber. The valve 126 can be at least partially opened by the controller 100 to at least partially release fluid 50 from the chamber as fluid 50b. When the desired amount of fluid has been released from the chamber 12, the valve 126 can be closed by the controller 100 to allow pressure to be maintained within the chamber. By controlling the valves 124, 126, the controller can control the level of fluid 50 in the chamber 12 as well as the type of fluid within the chamber. The controller 100 can determine the desired fluid 50 levels in the chamber 12 by reading the level meter 41 that indicates the position of the surface 52 of the fluid 50 in the chamber 12. For example, a first fluid 50 can be input into the chamber 12 for a portion of a wear test, then the first fluid 50 can be replaced by a second fluid 50 for a second portion of the wear test, and if desired a third fluid 50 can replace the second fluid for a third portion of the wear test. The chamber 12 at least partially filled by the fluid 50 can configure the wear tester 10 to simulate wear of the one or more samples 30, 32 in a fluid 50 that is representative of a wellbore fluid (e.g. formation oils, brines, drilling muds, completion fluids, fracking fluids, acidizing solutions, cement slurry, steam, water, sea water, ionized water, hydrocarbon gas, etc.) and at representative wellbore temperatures and pressures.

Degradation of samples during the wear test can be caused by several factors, at least three of which are abrasion contact of the sample 30, 32 with the abrasion device 20, the temperature of the sample 30, 32, and chemical reactions with the fluid 50. It is beneficial to determine the total degradation of the sample 30, 32 during the wear test, which includes all factors. It may also be desirable to determine the degradation (i.e. wear) of the sample 30, 32 attributed to each of these factors to better understand the effects of each factor. A control sample 34 can be suspended in the fluid 50 via a sample hanger 18. The control sample 34 is preferably the same material as at least one of the samples 30, 32 (or the same material as the drum 28 when the drum is the material being tested and the samples 30, 32 are the abrading material). The control sample 34 substantially reacts the same with the fluid 50 as the test samples 30, 32 (or drum 28). Therefore, the degradation of the samples caused by chemical reactions with the fluid 50 can be determined separately from the wear experienced by the sample 30, 32, which includes the total wear caused by all factors.

Wear measurements of the sample 30, 32 (or drum 28) can be adjusted to remove the effects of the fluid on the test samples to determine the amount of degradation attributable to the abrasion contact and temperature factors. If the wear test is conducted at ambient temperatures, then the amount of degradation attributable to the abrasion contact can be determined. As used herein, "wear" includes degradation caused by at least one of th abrasion contact due to engagement of the test samples with the abrasion device 20, chemical reactions of the test sample with the fluid 50, elevated temperatures, or combinations thereof.

During the wear test, the controller 100, which can be coupled to the various elements of the wear tester 10 via control lines 102, can control the temperature of the interior of the chamber 12 by controlling the heat transfer element 14; can control the amount of fluid 50 in the chamber 12; and can control the pressure P1 in the interior of the chamber 12. To control the pressure P1 in the chamber 12, the controller 100 can control a pressure source (not shown) that supplies an inlet fluid 78 at a pressure P3 into the inlet pressure tube 36. The inlet pressure tube 36 provides pressure and fluid communication between a pressure source and the interior of the chamber 12. A relief valve 64 extended into the chamber 12 through a wall of the housing 11 by the interface 90. The controller 100 can control the pressure source to increase or decrease the pressure P1 within the chamber 12. Therefore, the controller 100 can maintain the pressure P1 at a predetermined set-point pressure, or can fluctuate the pressure P1 during the wear test to simulate variable wellbore conditions.

Because the wear test can be performed at wellbore conditions, representative wellbore temperatures can cause the fluid 50 to boil if the fluid is a liquid with a boiling point at atmospheric pressure that is less than a predetermined temperature to be used in the wear test. Bubbles formed in the fluid 50 are generally not desirable during the wear test, since the bubbles can cause varied test results, especially, if the bubbles displace fluid 50 from engagement surfaces of the samples 30, 32 and the drum 28 during the wear test. By increasing the pressure P1 to an elevated pressure P1, the fluid 50 can be prevented from boiling during the test. Therefore, the wear tester 10 can be used to determine wear on the test samples (samples 30, 32; or drum 28) at elevated temperatures and pressures. It should be understood, that the wear tester 10 can also be used to determine wear on the test samples at low temperatures and pressures, with the controller decreasing the pressure P1 in the chamber 12 via inlet pressure tube 36, and cooling the chamber by using the heat transfer element 14 to cool the chamber. The heat transfer element 14 can include a refrigeration unit to extract heat from the chamber 12, and can thereby cool the chamber 12 below ambient temperatures.

The controller 100 can be coupled to sensors that measure various parameters (e.g. temperature at various locations, pressure inside and outside the chamber 12, strain applied to samples, engagement forces 70, 72, fluid level, motor speed, etc.) of the wear test system 10 to control the wear test as samples are being tested. The controller 100 can be coupled to these sensors via the control lines 102. The controller 100 can read these sensors and provide necessary control based on the sensor data. The level sensor 41 can be used to indicate the surface 52 of the fluid 50 in the chamber, if the fluid in the chamber is a liquid. One or more pressure measurement devices 60 can be coupled to pressure sensors 42 positioned at various locations within the chamber 12 (e.g. above the fluid 50, immersed in the fluid 50, etc.) to detect internal pressure P1, and at a position outside the chamber 12 to detect external pressure P2. The pressure P3 inside the inlet pressure tube 36 can also be measured and communicated to the controller 100.

One or more temperature measurement devices 62 can be coupled to temperature sensors 40, 44 positioned at various locations (e.g. above the fluid 50, immersed in the fluid 50, embedded in the test sample(s) 30, 32, positioned on the retainer 84, 86 or engagement arm 80, 82, embedded in the control sample 34, positioned in the inlet and outlet flow passages, etc.) to detect temperatures at those locations. Embedding temperature sensors 40 in and/or attaching to the test samples (e.g. 30, 32) can provide more accurate temperature readings of conditions experienced by the test samples 30, 32 during the wear test. These more accurate readings can be used to calculate and calibrate a wear resistance of the material of the test samples when the wear test samples are evaluated for wear at the conclusion of the wear test.

Figure 1B:
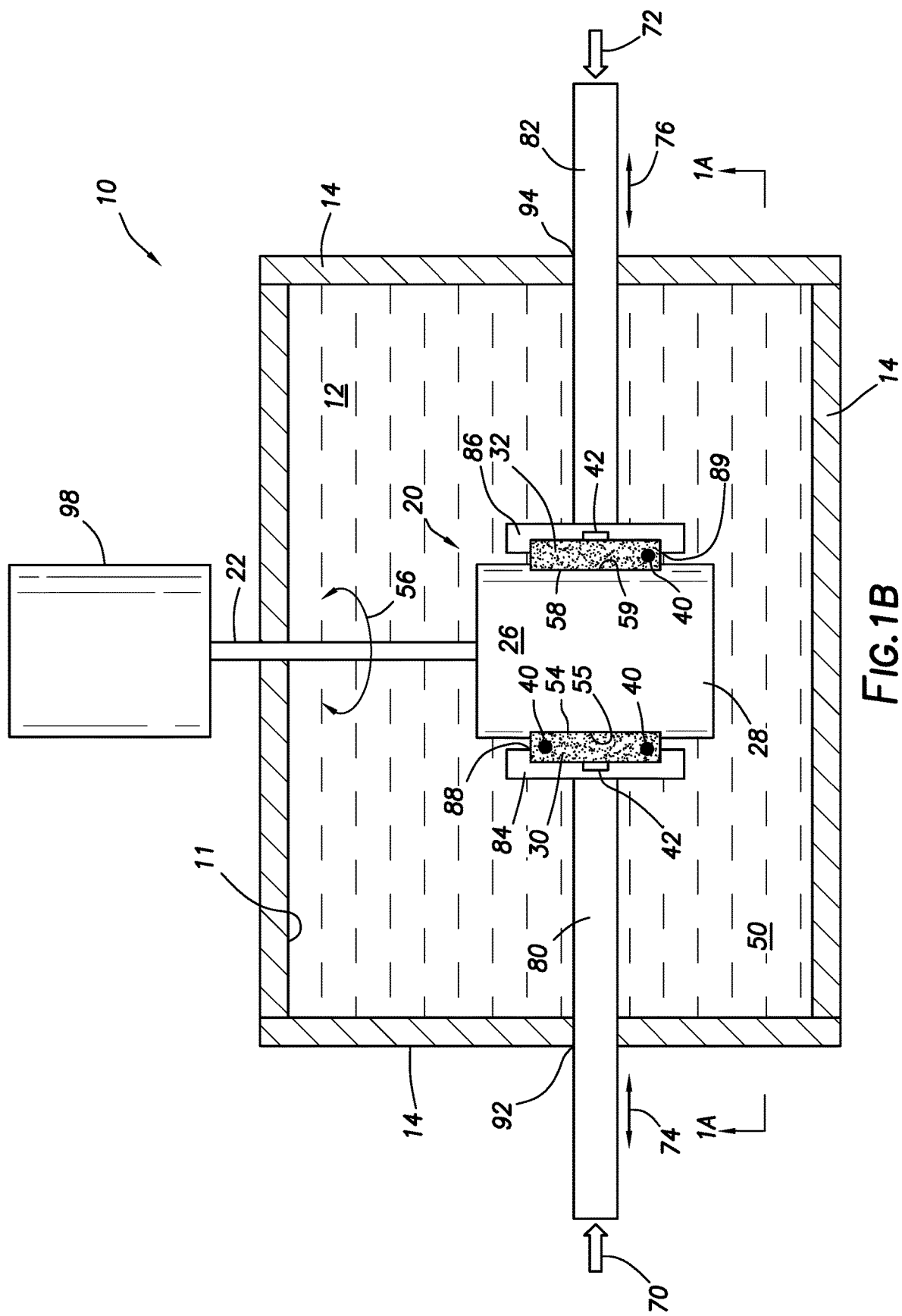
FIG. 1B is a representative partial cross-sectional top view of a system for emulating the wear of one or more samples in a characteristic wellbore environment, according to one or more example embodiments.

FIG. 1B is a representative partial cross-sectional top view of a system 10 for measuring wear of one or more samples 30, 32 in a characteristic wellbore environment. An actuation device 98 (such as a motor) can be attached to the drum 28 via the drive shaft 22 and controlled by the controller 100. As described above regarding FIG. 1A, rotational motion (arrows 56) can be imparted to the drum 28 by rotation of the drive shaft 22. The rotational motion can be rotations (i.e. spinning) in one direction, or rotational oscillations where the drum 28 is periodically rotated in opposite directions to create the oscillations. The drum 28 can be positioned between two test samples 30, 32 with the engagement arms 80, 82 applying a respective engagement force 70, 72 to the samples 30, 32 through the respective retainers 84, 86. Temperature sensors 40 and pressure sensor 42 can provide parameter measurements to the controller 100 that can record the sensor data in a non-transitory memory device and/or control the wear system based on the parameter measurements. With the samples immersed in the fluid 50, the rotational motion of the drum 28 can cause wear of the samples 30, 32 via abrasion contact of the samples 30, 32 with the outer surface 26 of the drum 28. An engagement surface 54 of sample 30 can engage with an engagement surface 55 of the outer surface 26, and an engagement surface 58 of sample 32 can engage with an engagement surface 59 of the outer surface 26. The engagement surfaces 54, 58 are portions of the outer surface 26 that are in contact with the surfaces 55, 59 of respective samples 30, 32. Again, the engagement forces 70, 72 determine the amount of contact force between the sample 30 and the drum 28 (i.e. between the engagement surfaces 54, 55) and between the sample 32 and the drum 28 (i.e. between the engagement surfaces 58, 59).

Figure 1C:
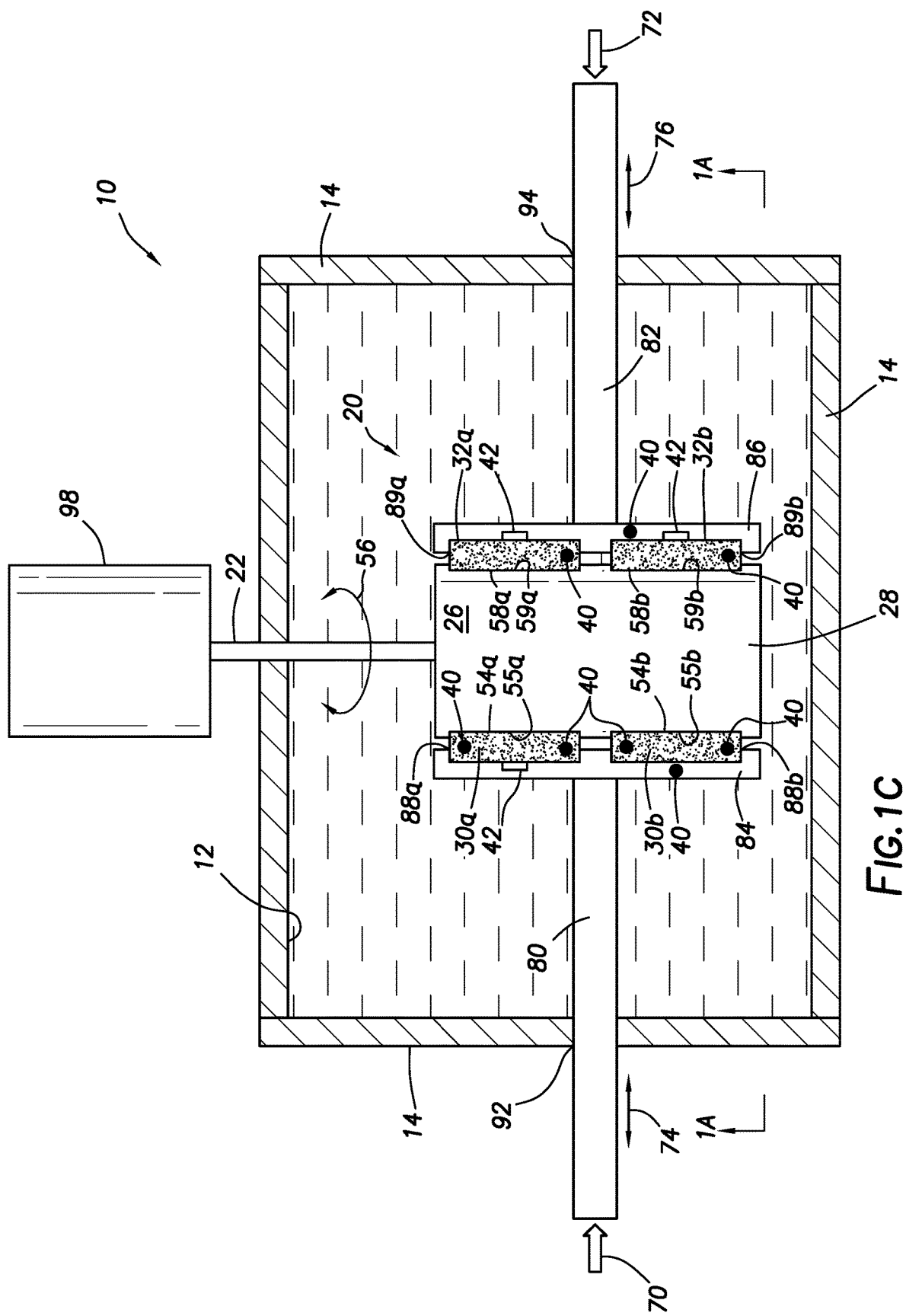
FIG. 1C is a representative partial cross-sectional top view of another system for emulating the wear of one or more samples in a characteristic wellbore environment, according to one or more example embodiments.

FIG. 1C is a representative partial cross-sectional top view of a system 10 for measuring wear of one or more samples 30a, 30b, 32a, 32b in a characteristic wellbore environment. The system 10 in FIG. 1C is very similar to the system 10 in FIG. 1B, except that the drum 28 is elongated, the retainers are extended to accommodate the elongated drum 28, and up to four test samples can be tested in this example. The samples 30a, 30b, 32a, 32b can be removably installed in recesses 88a, 88b, 89a, 89b, respectively, of the retainers 84, 86. Engagement surfaces 54a, 54b, 58a, 58b can engage surfaces 55a, 55b, 59a, 59b, respectively as the drum 28 is rotated (arrows 56).

Figure 2A:
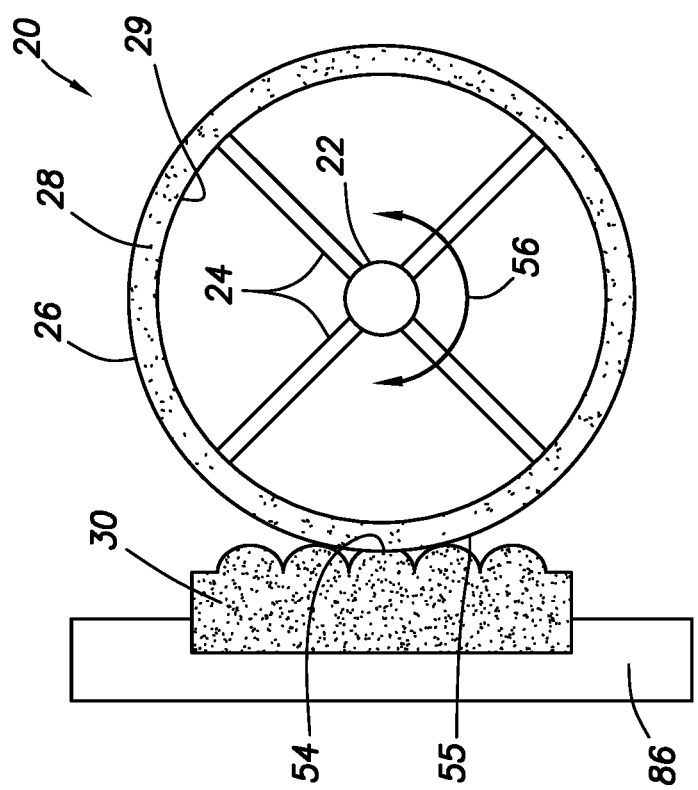
FIGS. 2A-2D are representative configurations of an abrasion device that may be included in any of the wear measurement systems, according to one or more embodiments.
Figure 2B:
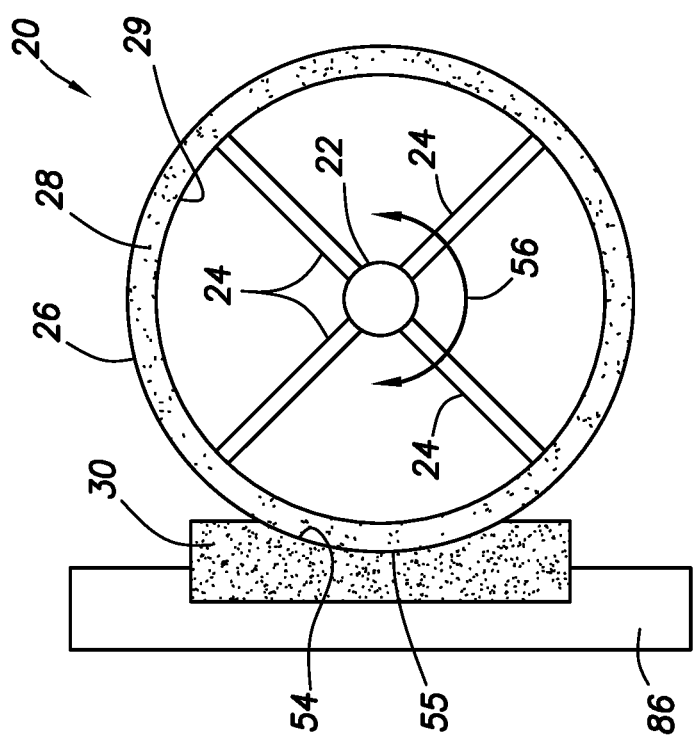

FIGS. 2A-2D are representative configurations of an abrasion device that can be included in any of the wear measurement systems 10 described in this disclosure. FIGS. 2A and 2B show a cylindrically shaped drum 28 with a hollow bore extending therethrough. The outer surface 26 can provide abrasion material that acts to abrade the sample 30 through engaging the surface 55 with the surface 54. The spokes 24 can stir the fluid 50 during a wear test which can improve interaction of the fluid 50 with the samples, and can better emulate circulating fluids downhole. Initially the surface 54 of the sample 30 may be planar in the configuration of FIG. 2A, and then be degraded to create a semi-circular recess in the sample 30 as the engagement surface 55 of the drum 28 abrades surface 54 of the sample 30. In FIG. 2B, the surface 54 of the sample 30 can be irregularly shaped, such as with rounded hills and valleys, to emulate surfaces other than planar surfaces in downhole equipment. The surface 55 of the outer surface 26 acts to abrade the irregular surface 54 during the wear test.

Figure 2C:
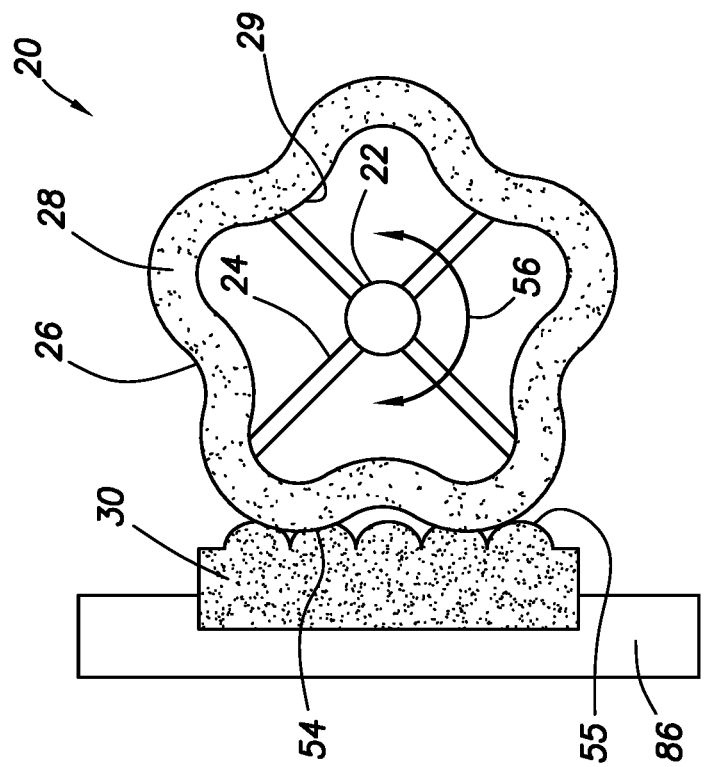
Figure 2D:
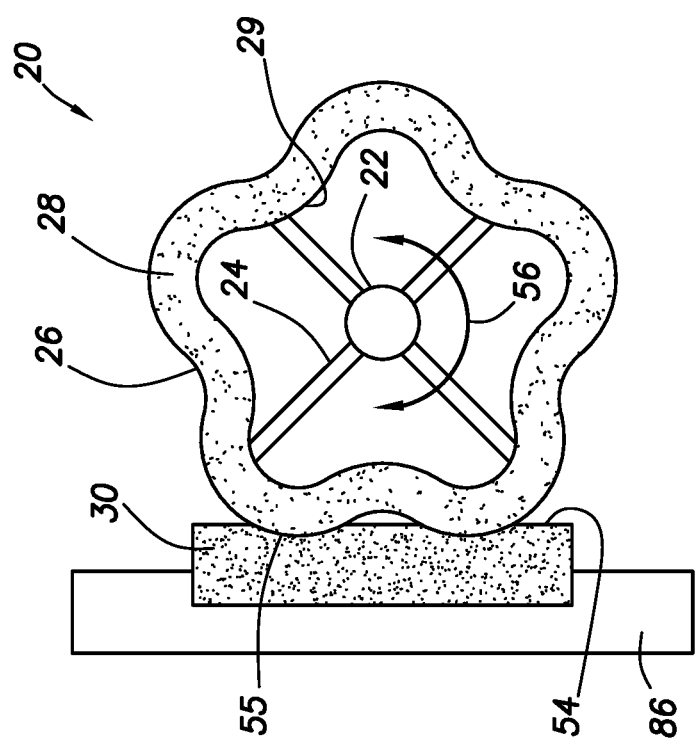

FIGS. 2C-2D can have similar samples 30, as shown in FIGS. 2A-2B, respectively. FIG. 2C shows a sample 30 with an initially planar surface 54, where FIG. 2D shows a sample 30 with an irregular planar surface 54. However, FIGS. 2C-2D include a different drum 28 configuration, which has an abrading surface 55 that is irregularly shaped with rounded hills and valleys. The inner surface 29 of the drum 28 can also be irregularly shaped with rounded hills and valleys, if the drum is hollow as in FIGS. 2C and 2D. Again the spokes 24 act to stir the fluid 50 as the drum is rotated in either direction. It should be understood that many configurations of the abrasion device 20 can be utilized in the wear measurement systems 10. For example, the sample 30 can be abraded by an oval shaped drum 28, the drum 28 can be eccentrically mounted to the drive shaft, the sample 30 can have a surface 54 that is initially concave or convex, the sample 30 can have a peaked surface 54 where the peak engages the surface 55 first, the sample 30 can have grooves or recesses in the surface 54 or protrusions from the surface 54. The outer surface 26 can also have recesses, grooves, or protrusions for emulating material configurations in downhole equipment.

Figure 3:
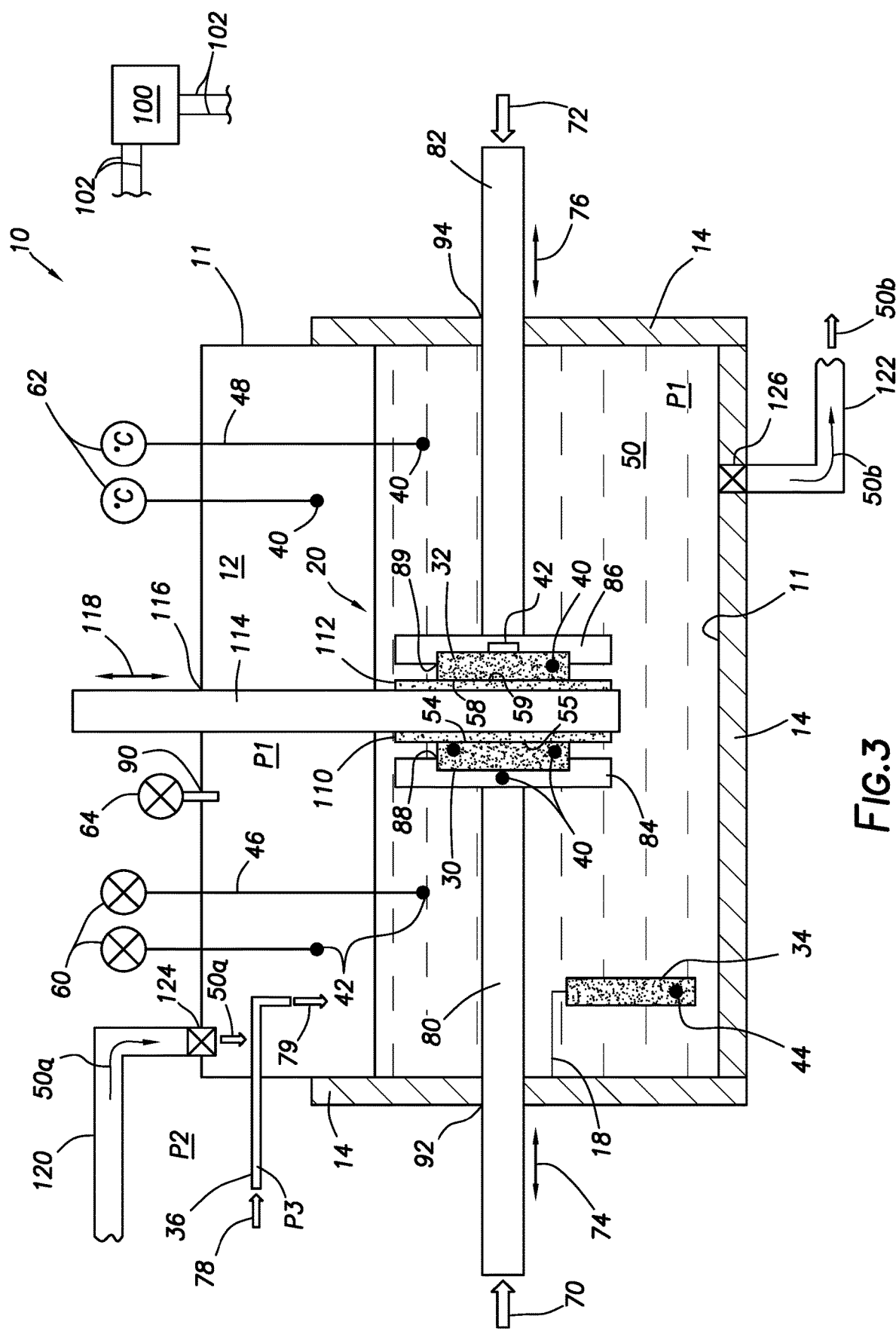
FIG. 3 is a representative partial cross-sectional side view of another system for emulating the wear of one or more samples in a characteristic wellbore environment, according to one or more example embodiments.

FIG. 3 is a representative partial cross-sectional side view of another system 10 for measuring wear of one or more samples in a characteristic wellbore environment. System 10 of FIG. 3 is similar to the system shown in FIG. 1A, except that the abrasion device 20 does not rotate to wear the test samples. The system 10 still includes the engagement arms 80, 82 and retainers 84, 86 for applying the engagement forces 70, 72 to the samples 30, 32. It should be understood that more samples can be tested in this system configuration by elongating the abrasion device 20. A test control sample 34 can be held in the fluid 50 by the hanger 18. The controller 100 can be coupled to the sensors 40, 42, 44, valves 124, 126, level sensor 41 (not shown), an actuation device 98 (not shown), and pressure sources to monitor the parameters of the wear test system 10 and control the wear test.

The abrasion device 20 of FIG. 3 produces linear motion between abrasion materials 110, 112 and the samples 30, 32. An actuation arm 114 can extend through the wall of the housing 11 at interface 116, which seals the arm 114 such that pressure P1 can be maintained in the chamber 12. The actuation device 98 (not shown) can be coupled to the arm 114 to produce linear reciprocation (arrows 118) of the arm 114 and create linear displacement of the abrasion materials 110, 112 relative to the samples 30, 32, thereby creating friction between the engagement surfaces 54, 58 and engagement surfaces 55, 59, respectively. The engagement forces 70, 72 are applied to the engagement arms 80, 82 to control the engagement forces on the engagement surfaces 54, 55, 58, 59.

Figure 4:
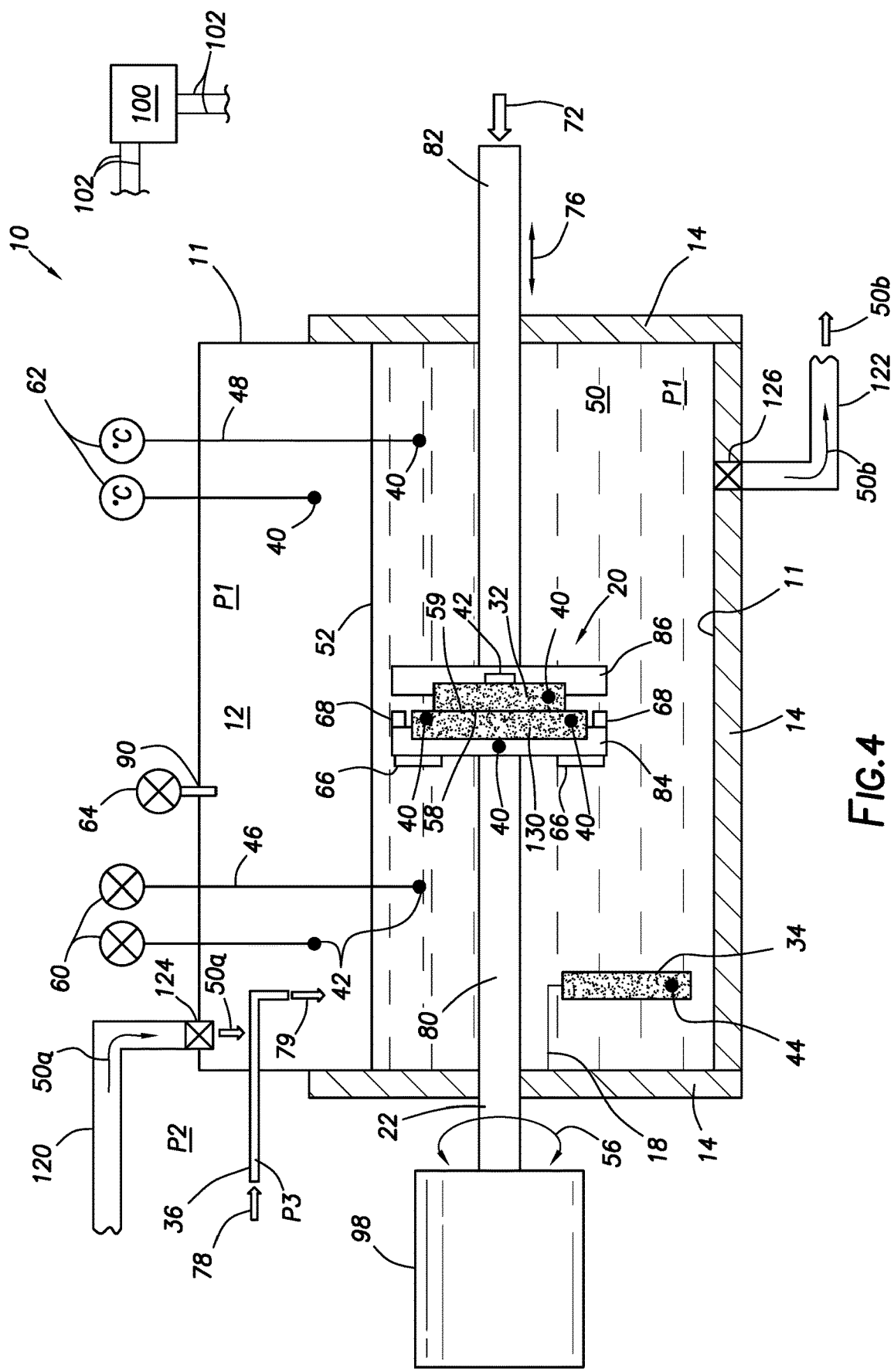
FIG. 4 is a representative partial cross-sectional side view of yet another system for emulating the wear of one or more samples in a characteristic wellbore environment, according to one or more example embodiments.

FIG. 4 is a representative partial cross-sectional side view of yet another system 10 for measuring wear of one or more samples in a characteristic wellbore environment. System 10 of FIG. 4 is similar to the system shown in FIG. 1A, except that the abrasion device 20 rotates about an axis that is parallel with the engagement arm 82, such that the abrasion material 130 engages the sample 32 with a circular motion between engagement surfaces 58, 59. An actuation device 98 (e.g. a motor) can be coupled to the engagement arm 80 that can be the drive shaft 22 in this example. The retainer 84 can be attached to the drive shaft 22 and the abrasion material 130 can be attached to an opposite side of the retainer 84. The actuation device 98 can rotate (either spinning in one direction, or rotationally oscillating between opposite directions) the drive shaft and thus the abrasion material 130. Protrusions 66 and 68 can be used to stir the fluid 50 during the wear test. The retainer 86 can be attached to the engagement arm 82 on one side with the sample 30 removably attached to the opposite side of the retainer. The engagement arm can move in and out of the housing (arrows 76) to selectively engage the sample 30 with the abrasion material 130. During the wear test, the abrasion material 130 is circularly rotated with respect to the sample 32, such that the engagement surface 59 of the material 130 circularly rotates relative to the engagement surface 58 of the sample 32. As before, the engagement force 72 is applied to the engagement arm 82 to produce increased engagement forces between the surfaces 58, 59. It should be understood that more samples can be tested in this system configuration by portioning the sample 32 into multiple samples. A test control sample 34 can be held in the fluid 50 by the hanger 18. The controller 100 can be coupled to the sensors 40, 42, 44, valves 124, 126, level sensor 41 (not shown), the actuation device 98, and pressure sources to monitor parameters of the wear test and control the wear test system 10.

Figure 5:
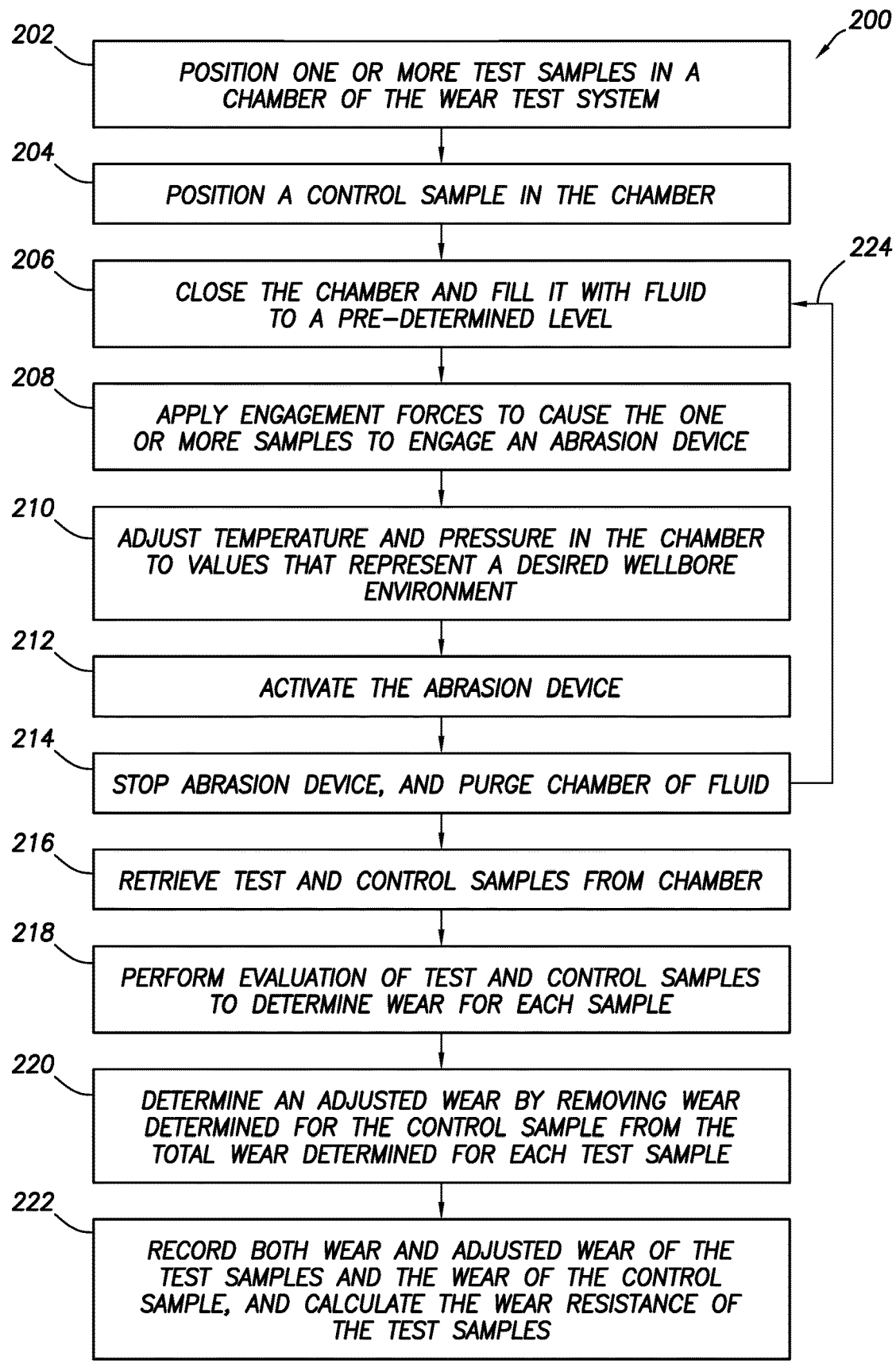
FIG. 5 is a representative block diagram of a method that uses a wear test system to emulate the wear of one or more samples in a characteristic wellbore environment, according to one or more example embodiments.

FIG. 5 is a representative block diagram of a method 200 that uses a wear test system to emulate the wear of one or more samples in a characteristic wellbore environment and determine the wear resistances of the one or more samples. In operation 202, one or more test samples are positioned within the chamber 12 of the wear test system 10. As shown in previous figures, the test samples (e.g. samples 30, 32) can be removably attached to retainers 84, 86. In operation 204, a control sample, that is preferably made of the same material as one or more of the test samples, can be positioned on a hanger 18 in the chamber such that the control sample is immersed in a fluid 50 when the fluid 50 is introduced into the chamber 12. It should be understood that this control sample 34 may not be needed, such as when a fluid is not used during the wear test. In operation 206, if fluid is to be used in the wear test, the housing 11 is closed and the controller can cause fluid 50 to be pumped into the chamber 12 via the inlet flow passage 120 and valve 124 to at least partially fill the chamber. The controller 100 can open valve 124 to flow fluid 50a into the chamber 12 as fluid 50 until a pre-determined level (if the fluid is a liquid) of the fluid 50 is achieved. If the fluid is a gas, then the level sensor 41 may not be used and the pressure P1 can be used to determine the amount of fluid 50 pumped into the chamber 12.

In operation 208, the controller 100 can control force generators (not shown) to apply the predetermined engagement forces 70, 72 to the engagement arms 80, 82, which transfers the engagement forces 70, 72 to the test samples (e.g. 30, 32), thereby causing engagement of the test samples with the abrasion device. In operation 210, the controller can control the heat transfer element 14 to adjust the temperature in the chamber to a predetermined level and can control a pressure source that supplies fluid 79 (e.g. nitrogen) into the chamber 12 at pressure P3 to increase the pressure P1 in the chamber 12 to a predetermined level.

In operation 212, the controller 100 can activate the abrasion device 20 to begin abrading of the test samples. The controller 100 can control the actuation device 98 to rotate a drum 28 that abrades the test samples, to provide linear reciprocation of the abrading material that engages the test sample(s), or to provide circular motion of the abrading material that engages the test sample(s). The abrasion device 20 can be operated for an extended period of time to produce the desired amount of wear in the test sample(s). The temperature and pressures in the chamber 12 can be adjusted during the abrading process based on a temperature profile and a pressure profile, or they can be held substantially constant throughout the wear test. In operation 214, when a desired amount of wear is achieved, and/or a pre-determined period of time has elapsed, then the controller 100 can stop the engagement motion between the abrasion device 20 and the test sample(s). The fluid 50 can be purged from the chamber 12 via the outlet flow passage 122 and the valve 126 (valve 124 may also be opened to allow pressure equalization between P1 and P2. In operation 216, if the test is complete, the housing 11 can be opened, and the test and control samples removed for evaluation.

However, if additional testing is desired, then operations 206 through 214 can be repeated (arrow 224) as many times as necessary to emulate various downhole conditions. When the fluid 50 is purged in operation 214, the same type of fluid 50 or a different type of fluid 50 can be pumped into the chamber 12 via the inlet flow passage 120. As multiple iterations of operations 206 through 214 are performed, a profile of fluid types can be introduced into the chamber mixing with or replacing the fluid 50.

In operation 216, the test samples can be removed from the chamber 12 to evaluated for wear. Well known laboratory procedures can be used to determine the amount and types of wear that occurred to the test samples (and the control sample, if used) during the wear test. The wear on the test samples can include wear attributed to all sources of wear provided during the wear test, such as wear caused by chemical reactions, erosion, abrasion contact, elevated heat or a chilled environment, pressure, etc. Wear on the control sample can include wear caused by chemical reactions, elevated heat or a chilled environment, and pressure, but not by erosion or abrasion contact. Therefore, this allows the amount of wear to the test samples attributed only to erosion and/or abrasion contact to be determined by adjusting the amount of wear on the test samples to remove the amount of wear attributed to chemical reactions, elevated heat or a chilled environment, or pressure. The wear resistance of each of the test samples can be determined from the detected wear and the test parameters.

In one or more embodiments, a system for causing wear to a material in representative downhole conditions comprises a housing with a chamber at least partially filled with a fluid, an abrasion device at least partially immersed in the fluid, a heat transfer element thermally coupled to the housing, and a first engagement arm coupled to the housing. The heat exchanger can be coupled to the housing by being mounted internally in the housing, externally to the housing, or via energy radiation directed at the housing from a remote location (e.g. across a room, etc.) that heats the fluid within the chamber. The first (and second) engagement arms can be coupled to the housing by extending through a wall of the housing, mounted in an interior of the housing, and/or mounted to an exterior of the housing. The mounting the arms is such that the arm can be used to apply an engagement force to the test samples in the chamber. The system can further comprise a first test sample of the material attached to the first engagement arm, the first engagement arm configured to apply a first engagement force through the first engagement arm to the first test sample, which causes engagement of the first test sample with the abrasion device, an actuation device that displaces the abrasion device relative to the first test sample, and can cause wear of the first test sample during a wear test in response to the engagement of the first test sample with the abrasion device. A controller can control a thermal output of the heat transfer element to maintain the chamber within a temperature range that is representative of the downhole conditions.

In one or more embodiments, the system for causing wear to a material in representative downhole conditions can further comprise a pressure source in pressure communication with the chamber, where the pressure source can be controlled by the controller to maintain pressure in the chamber at a level representative of the downhole environment. The controller can control an output of the pressure source to increase or decrease a pressure inside the chamber to maintain the pressure in the chamber within a pre-determined range of pressures. The controller can control the thermal output of the heat transfer element to increase the temperature in the chamber to a level above a boiling point of the fluid. The controller can control the pressure source to maintain pressure in the chamber at a level that prevents boiling of the fluid by increasing or decreasing the output of the pressure source. The fluid can be selected from a group consisting of a formation oils, brines, drilling muds, completion fluids, fracking fluids, acidizing solutions, cement slurry, steam, water, sea water, ionized water, hydrocarbon gas, and combinations thereof.

In one or more embodiments, the system can further comprise an abrasion device that is a cylindrical drum and the displacement of the abrasion device relative to the first test sample can be caused by a rotation of the cylindrical drum, and the first test sample can engage an outer surface of the drum.

In one or more embodiments, the system can further comprise a second engagement arm coupled to the housing, a second test sample of the material attached to the second engagement arm, and the second engagement arm can be configured to apply a second engagement force through the second engagement arm to the second test sample, which causes engagement of the second test sample with the abrasion device. The displacement of the abrasion device can cause wear of the second test sample during the wear test in response to the engagement of the second test sample with the abrasion device. The first and second test samples can engage opposite sides of the abrasion device. The abrasion device can comprise spokes or protrusions that stir the fluid during the wear test as the abrasion device is in motion. The system can further include a control sample of the material immersed in the fluid during the wear test. This control sample can experience wear (or degradation) due to interaction with the fluid at the temperature and pressure in the chamber. The wear experienced by the control sample can be subtracted from the wear experienced by the first and/or second test samples to yield that wear caused by engagement with the abrasion device at the downhole conditions.

In one or more embodiments, the system can further comprise one or more temperature sensors, one or more pressure sensors, and one or more level sensors communicatively coupled to the controller, where the controller receives data from these sensors and monitors the temperature of one or more selected from a group consisting of the first test sample, the control sample, the fluid, inside the chamber, and outside the chamber, monitors the pressure inside the chamber, and monitors the fluid level inside the chamber. Based on the sensor data, the controller can control the temperature and pressure inside the chamber (via controlling outputs of the heating element and the pressure source), the engagement force applied to the first test sample (via controlling the force applied to the engagement arm), and/or the displacement of the abrasion device (via controlling the motor).

In one or more embodiments, the system can further comprise an inlet flow passage that selectively permits and prevents flow of the fluid into the chamber, and an outlet flow passage that selectively permits and prevents flow of the fluid from the chamber.

In one or more embodiments, a method of determining wear resistance of a material in representative downhole conditions can comprise operations of disposing a first test sample of the material in a chamber of a housing, at least partially immersing the first test sample in a fluid, maintaining a predetermined temperature in the chamber by controlling an output of a heat transfer element that is thermally coupled to the housing, applying a first engagement force to the first test sample, thereby engaging the first test sample with an abrasion device, displacing the abrasion device relative to the first test sample thereby causing wear of the first test sample during a wear test in response to the engagement of the first test sample with the abrasion device; determining the wear of the first test sample that occurs during the wear test; and determining the wear resistance of the material based on the wear of the first test sample.

In one or more embodiments, the method can further comprise mounting the test sample to an engagement arm that extends through a wall of the housing, where the engagement arm applies the engagement force to the first test sample. The method can further comprise maintaining a predetermined pressure in the chamber by controlling a pressure source coupled to the housing, where the predetermined temperature and pressure are representative of the downhole conditions. The predetermined temperature can be a pre-determined range of temperatures. The predetermined pressure can be a pre-determined range of pressures. The predetermined temperature can be above a boiling point of the fluid and the predetermined pressure can be set to a level that prevents the fluid from boiling. The predetermined temperature can also be a profile of predetermined temperatures or temperature ranges and the predetermined pressure can also be a profile of predetermined pressures or pressure ranges.

The method of claim 13, further comprising immersing a control sample of the material in the fluid; and determining the wear of the control sample caused by interactions with the fluid in response to completion of the wear test.

In one or more embodiments, the method can further comprise multiple first test samples mounted to a first engagement arm, where the first engagement arm can engage the multiple first test samples with the abrasion device.

In one or more embodiments, the method can further comprise disposing a second test sample of the material in the chamber, at least partially immersing the second test sample in the fluid, applying a second engagement force to the second test sample, thereby engaging the second test sample with the abrasion device, displacing the abrasion device relative to the second test sample thereby causing wear of the second test sample during the wear test in response to the engagement of the second test sample with the abrasion device, determining the wear of the second test sample that occurs during the wear test, and determining the wear resistance of the material based on the wear of the first and second test samples. The second test sample can comprise multiple second test samples mounted to a second engagement arm, and the second engagement arm can engage the multiple second test samples with the abrasion device.

In one or more embodiments, the method can further comprise pumping fluid into the chamber via an inlet flow passage with an inlet valve disposed therein that selectively permits and prevents fluid flow through the inlet flow passage, and pumping fluid out of the chamber via an outlet flow passage with an outlet valve disposed therein that selectively permits and prevents fluid flow through the outlet flow passage. The method can further comprise pumping a first fluid into the chamber through an inlet flow passage coupled to the chamber, displacing the abrasion device relative to the first test sample thereby causing wear of the first test sample during a first portion of the wear test in response to the engagement of the first test sample with the abrasion device, pumping the first fluid out of the chamber through an outlet flow passage coupled to the chamber, pumping a second fluid into the chamber through the inlet flow passage, displacing the abrasion device relative to the first test sample thereby causing wear of the first test sample during a second portion of the wear test in response to the engagement of the first test sample with the abrasion device, and pumping the second fluid out of the chamber through an outlet flow passage.

Furthermore, the illustrative methods described herein may be implemented by a system comprising processing circuitry that can include a non-transitory computer readable medium comprising instructions which, when executed by at least one processor of the processing circuitry, causes the processor to perform any of the methods described herein.

Although various embodiments have been shown and described, the disclosure is not limited to such embodiments and will be understood to include all modifications and variations as would be apparent to one skilled in the art. Therefore, it should be understood that the disclosure is not intended to be limited to the particular forms disclosed; rather, the intention is to cover all modifications, equivalents, and alternatives falling within the spirit and scope of the disclosure as defined by the appended claims.

The invention claimed is:

1. A system for causing wear to a material, the system comprising:
    a housing with a chamber at least partially filled with a fluid;
    an inlet flow passage with an inlet valve disposed therein that selectively permits and prevents fluid flow into the chamber;
    an abrasion device at least partially immersed in the fluid;
    a heat transfer element thermally coupled to the housing;
    a first engagement arm coupled to the housing and configured to move in and out of the chamber through a first wall of the housing;
    a second engagement arm coupled to the housing and configured to move in and out of the chamber through a second wall of the housing;
    a first test sample of the material attached to the first engagement arm, the first engagement arm configured to apply a first engagement force through the first engagement arm to the first test sample, which causes engagement of the first test sample with the abrasion device;
    a second test sample of the material attached to the second engagement arm, the second engagement arm configured to apply a second engagement force through the second engagement arm to the second test sample, which causes engagement of the second test sample with the abrasion device;
    an actuation device that displaces the abrasion device relative to the first and second test samples, and causes wear of the first and second test samples during a wear test in response to the engagement of the first and second test samples with the abrasion device; and
    a controller that controls a thermal output of the heat transfer element to maintain the chamber within a predetermined temperature range.

2. The system of claim 1, further comprising a pressure source in pressure communication with the chamber, wherein the controller controls the pressure source to maintain pressure in the chamber at a predetermined level.

3. The system of claim 1, wherein the controller controls the thermal output of the heat transfer element to increase a temperature in the chamber to a level above a boiling point of the fluid.

4. The system of claim 3, wherein the controller controls a pressure source to maintain pressure in the chamber at a level that prevents boiling of the fluid.

5. The system of claim 1, wherein the fluid is selected from a group consisting of a formation oils, brines, drilling muds, completion fluids, fracking fluids, acidizing solutions, cement slurry, steam, water, sea water, ionized water, hydrocarbon gas, and combinations thereof.

6. The system of claim 1, wherein the abrasion device is a cylindrical drum and the displacement of the abrasion device relative to the first and second test samples is caused by a rotation of the cylindrical drum, and wherein the first and second test samples engage an outer surface of the drum.

7. The system of claim 1, wherein the first and second test samples engage opposite sides of the abrasion device.

8. The system of claim 1, wherein the abrasion device comprises spokes or protrusions that stir the fluid during the wear test as the abrasion device is in motion.

9. The system of claim 1, further comprising a control sample of the material that is immersed in the fluid during the wear test.

10. The system of claim 9, further comprising a plurality of sensors, the plurality of sensors including one or more temperature sensors, one or more pressure sensors, and one or more level sensors communicatively coupled to the controller, wherein the controller:
    receives sensor data from the plurality of sensors;
    monitors a temperature of one or more selected from a group consisting of the first test sample, the second test sample, the control sample, the fluid, inside the chamber, and outside the chamber;
    monitors a pressure inside the chamber;
    monitors a fluid level inside the chamber; and
    based on the sensor data, controls the temperature inside the chamber, the pressure inside the chamber, the first engagement force applied to the first test sample, the second engagement force applied to the second test sample, and the displacement of the abrasion device.

11. The system of claim 10, wherein the first and second engagement forces applied to the first and second test samples are varied by the controller during the wear test.

12. The system of claim 1, further comprising:
    an outlet flow passage with an outlet valve disposed therein that selectively permits and prevents flow of the fluid from the chamber.

13. A method of determining wear resistance of a material, the method comprising:
    placing a first test sample of the material in a chamber of a housing by mounting the first test sample to a first engagement arm that is coupled to the housing and configured to move in and out of the chamber through a first wall of the housing;
    placing a second test sample of the material in the chamber of the housing by mounting the second test sample to a second engagement arm that is coupled to the housing and configured to move in and out of the chamber through a second wall of the housing;
    pumping a fluid into the chamber via an inlet flow passage to at least partially immerse the first and second test samples placed therein, the inlet flow passage having an inlet valve disposed therein that selectively permits and prevents a flow of the fluid into the chamber;
    maintaining a predetermined temperature in the chamber by controlling an output of a heat transfer element that is thermally coupled to the housing;
    applying a first engagement force to the first test sample, thereby engaging the first test sample with an abrasion device;
    applying a second engagement force to the second test sample, thereby engaging the second test sample with the abrasion device;

displacing the abrasion device relative to the first and second test samples thereby causing wear of the first and second test samples during a wear test in response to the engagement of the first and second test samples with the abrasion device;

determining the wear of the first and second test samples that occur during the wear test; and determining the wear resistance of the material based on the wear of the first and second test samples.

14. The method of claim 13, wherein the first and second engagement arms apply the first and second engagement forces, respectively to the first and second test samples.

15. The method of claim 13, further comprising maintaining a predetermined pressure in the chamber by controlling a pressure source coupled to the housing.

16. The method of claim 15, wherein the predetermined temperature and the predetermined pressure are based on sensor data received from respective temperature and pressure sensors.

17. The method of claim 15, wherein the predetermined temperature is above a boiling point of the fluid and the predetermined pressure prevents the fluid from boiling.

18. The method of claim 15, wherein the predetermined temperature is a profile of predetermined temperatures and the predetermined pressure is a profile of predetermined pressures.

19. The method of claim 13, further comprising:
placing a control sample of the material in the chamber to immerse the control sample in the fluid pumped into the chamber; and
determining the wear of the control sample caused by interactions with the fluid in response to completion of the wear test.

20. The method of claim 13, wherein the first test sample comprises multiple first test samples mounted to the first engagement arm, and wherein the first engagement arm engages the multiple first test samples with the abrasion device.

21. The method of claim 20, wherein the second test sample comprises multiple second test samples mounted to the second engagement arm, and wherein the second engagement arm engages the multiple second test samples with the abrasion device.

22. The method of claim 13, wherein the abrasion device includes spokes or protrusions that stir the fluid during the wear test as the abrasion device is in motion.

23. The method of claim 13, further comprising pumping fluid out of the chamber via an outlet flow passage with an outlet valve disposed therein that selectively permits and prevents fluid flow through the outlet flow passage.

24. The method of claim 13, further comprising:
pumping a first fluid into the chamber through the inlet flow passage coupled to the chamber;
displacing the abrasion device relative to the first and second test samples thereby causing wear of the first and second test samples during a first portion of the wear test in response to the engagement of the first and second test samples with the abrasion device;
pumping the first fluid out of the chamber through an outlet flow passage coupled to the chamber;
pumping a second fluid into the chamber through the inlet flow passage;
displacing the abrasion device relative to the first and second test samples thereby causing wear of the first and second test samples during a second portion of the wear test in response to the engagement of the first and second test samples with the abrasion device; and
pumping the second fluid out of the chamber through the outlet flow passage.

25. The method of claim 13, wherein the first test sample is comprised of a first material and the second test sample is comprised of a second material, and wherein determining the wear resistance comprises determining the wear resistance of the first and second materials.

* * * * *